L. WHITE.
Lamp.
No. 25,475.
Patented Sept. 13, 1859.
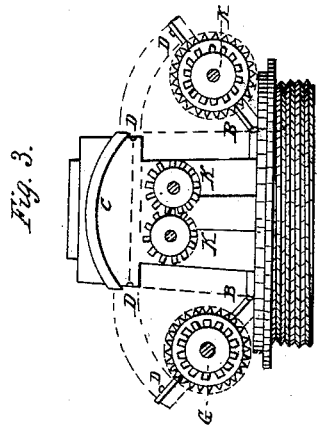
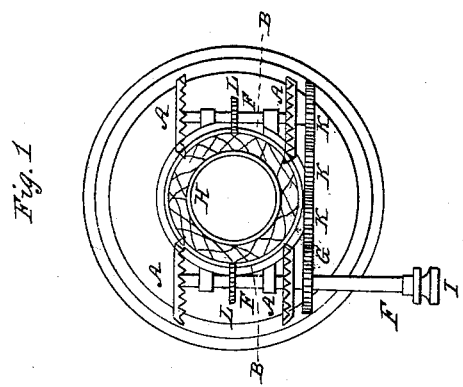
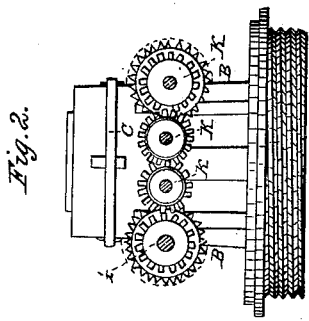
Witnesses:
Wm Vine
A M White
Inventor:
Lewis White

UNITED STATES PATENT OFFICE.

LEWIS WHITE, OF HARTFORD, CONNECTICUT, ASSIGNOR TO HIMSELF, AND DANL. McLAUGHLIN, OF NEW YORK, N. Y.

LAMP.

Specification of Letters Patent No. 25,475, dated September 13, 1859.

*To all whom it may concern:*

Be it known that I, LEWIS WHITE, of the city of Hartford, county of Hartford, and State of Connecticut, have invented a new and useful Improvement in the Mode of Constructing Lamp-Tops; and I do hereby declare that the following is a correct description thereof, reference being had to the accompanying drawing and to the letters of reference marked thereon.

The nature of my invention consists in the application and arrangement of a series of gear wheels and movements for raising, lowering, and adjusting the lamp wick while burning, also an improved method of putting the wick in the tube.

To enable others skilled in the art to make and use my invention I will proceed to describe the construction and operation.

The drawing: Figure 1 a plan view of the top when in use; Fig. 2 a side view of the top when in use; Fig. 3 a side view when the parts are lowered or opened to put in another wick.

I make my top and wick tube of the usual conical cylinder shape with proper attachments and preparations for the lamp glass, &c. I prepare a series of miter and plain toothed groove wheels, with proper bearings, spindles, &c. The miter (or plain toothed) wheels A, A, A, A, I place upon bearings at opposite angles in such a position that the sharp pointed teeth shall just penetrate the surface of the wick sufficient to raise, lower and adjust the same. The bearings for these gear wheels I fix to the movable portion B of the outer tube. This part B of the tube is hung with joints at the bottom edge to allow it to fall upon and downward, for the convenience of putting in the wick when required, (which in the ordinary cases is a difficult matter.) In this manner the difficulty is obviated. To operate the movement of this falling flap B of the tube, there is a projection on the top D with a hole or pin in it corresponding with one in the outer cylinder near the top, when the same is closed up. The movable ring C, is pressed down over the projection D encircling the two and retains the same in their places, causing the gears to press into the wick H, ready for raising or falling the same when actuated by the spindle F F, which extends to the outside of the top and receives on it the main actuating gear wheel G, and knob I. By turning the knob and spindle F, the whole of the gear and plain toothed wheels are put in motion by the meshing in and connection of the wheel G and wheels K K K.

I place a small toothed wheel L, L, on each of the spindles F in the center to assist in the adjusting the wick so that I have six operating gear teeth at one time acting.

The utility of this improvement in raising and lowering the wick while burning is in the economy and simplicity of the movement and in the convenience of inserting a fresh wick into and over the tube.

I do not claim as my invention the adjusting lamp wicks by the action of gear wheels except in the manner herein described.

What I claim as my invention and desire to secure by Letters Patent is—

1. The application, and arrangement of the operating gears, when placed in the manner, and for the purpose as herein described.

2. I also claim the movable flaps, B, B, in the manner and for the purpose substantially as herein described.

LEWIS WHITE.

Witnesses:
WM. VINE,
GEO. S. GILMAN.